US009552033B2

(12) United States Patent
Venkumahanti et al.

(10) Patent No.: US 9,552,033 B2
(45) Date of Patent: Jan. 24, 2017

(54) LATENCY-BASED POWER MODE UNITS FOR CONTROLLING POWER MODES OF PROCESSOR CORES, AND RELATED METHODS AND SYSTEMS

(71) Applicant: QUALCOMM Incorporated, San Diego, CA (US)

(72) Inventors: Suresh Kumar Venkumahanti, Austin, TX (US); Peter Gene Sassone, Austin, TX (US); Sanjay Bhagawan Patil, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 14/258,541

(22) Filed: Apr. 22, 2014

(65) Prior Publication Data
US 2015/0301573 A1 Oct. 22, 2015

(51) Int. Cl.
G06F 1/32 (2006.01)
G06F 9/48 (2006.01)

(52) U.S. Cl.
CPC .......... *G06F 1/3203* (2013.01); *G06F 1/3206* (2013.01); *G06F 1/3243* (2013.01); *G06F 1/3296* (2013.01); *G06F 9/48* (2013.01); *Y02B 60/1239* (2013.01)

(58) Field of Classification Search
None
See application file for complete search history.

(56) References Cited

U.S. PATENT DOCUMENTS

| 6,233,690 | B1 | 5/2001 | Choi et al. | |
| 2003/0126186 | A1* | 7/2003 | Rodgers | G06F 9/3009 718/107 |
| 2005/0289377 | A1* | 12/2005 | Luong | G06F 1/3203 713/322 |
| 2006/0200684 | A1* | 9/2006 | Bibikar | G06F 1/3203 713/300 |
| 2006/0236136 | A1 | 10/2006 | Jones | |

(Continued)

OTHER PUBLICATIONS

International Search Report and Written Opinion for PCT/US2015/022014, mailed Jul. 2, 2015, 14 pages.

(Continued)

*Primary Examiner* — Kim Huynh
*Assistant Examiner* — Paul J Yen
(74) *Attorney, Agent, or Firm* — Withrow + Terranova, PLLC

(57) ABSTRACT

Latency-based power mode units for controlling power modes of processor cores, and related methods and systems are disclosed. In one aspect, the power mode units are configured to reduce power provided to the processor core when the processor core has one or more threads in pending status and no threads in active status. An operand of an instruction being processed by a thread may be data in memory located outside processor core. If the processor core does not require as much power to operate while a thread waits for a request from outside the processor core, the power consumed by the processor core can be reduced during these waiting periods. Power can be conserved in the processor core even when threads are being processed if the only threads being processed are in pending status, and can reduce the overall power consumption in the processor core and its corresponding CPU.

30 Claims, 7 Drawing Sheets

(56) References Cited

U.S. PATENT DOCUMENTS

| | | | |
|---|---|---|---|
| 2009/0172434 A1 | 7/2009 | Kwa et al. | |
| 2010/0131785 A1* | 5/2010 | Blackburn | G06F 1/3203 |
| | | | 713/320 |
| 2010/0332876 A1* | 12/2010 | Fields, Jr. | G06F 1/3203 |
| | | | 713/323 |
| 2010/0332879 A1* | 12/2010 | Nakata | G06K 15/4055 |
| | | | 713/323 |
| 2011/0173474 A1 | 7/2011 | Salsbery et al. | |
| 2011/0314314 A1 | 12/2011 | Sengupta | |
| 2013/0073884 A1 | 3/2013 | Ulmer et al. | |
| 2013/0275791 A1 | 10/2013 | Ulmer et al. | |
| 2014/0006824 A1 | 1/2014 | Maciocco et al. | |

OTHER PUBLICATIONS

Examination Report for Bangladesh Patent Application No. BP/P/2015/000070, issued Mar. 7, 2016, 2 pages.

Second Written Opinion for PCT/US2015/022014, mailed Apr. 28, 2016, 11 pages.

Notification Concerning Informal Communications with the Applicant for PCT/US2015/022014, mailed Jul. 26, 2016, 4 pages.

International Preliminary Report on Patentability for PCT/US2015/022014, mailed Jul. 29, 2016, 28 pages.

\* cited by examiner

LATENCY-BASED POWER MODE UNITS FOR CONTROLLING POWER MODES OF PROCESSOR CORES, AND RELATED METHODS AND SYSTEMS

BACKGROUND

I. Field of the Disclosure

The technology of the disclosure relates generally to processor cores, and particularly to controlling power modes of processor cores.

II. Background

Processor-based computer systems can include one or more central processing units (CPUs) that each includes one or more processor cores for instruction execution. Each processor core includes hardware resources used to process an instruction through multiple pipeline stages. For example, processing an instruction in a pipeline may include fetching the instruction and decoding the instruction prior to sending the instruction to an execution unit, such as an arithmetic logic unit. Further, hardware resources of a processor core can be divided into separate portions known as "threads," also referred to as "hardware threads." The threads provide the processor core with the ability to process multiple instructions concurrently in parallel. More specifically, a thread within a processor core can process an instruction at the same time another thread within the same processor core processes a different instruction.

In this regard, processing instructions within a processor core contributes to the overall power consumption of the corresponding CPU. In an effort to conserve power, the CPU may employ a power control unit that is configured to control a power level of a processor core depending on the activity of the processor core. For example, the power control unit may provide a nominal power level to the processor core while at least one thread is in active status, so as to provide sufficient power to drive the hardware resources within the processor core to process instructions. However, if no threads are in active status in a processor core, the power control unit may power collapse the processor core to conserve power. In this manner, power consumption of the processor core, and its corresponding CPU, is conserved by providing nominal power to the processor core when the processor core has a thread in active status, and power collapsing the processor core when all threads are inactive.

SUMMARY OF THE DISCLOSURE

Aspects disclosed in the detailed description include latency-based power mode units for controlling power modes of processor cores. Related methods and systems are also disclosed. In aspects herein, rather than a power mode unit only being able to power collapse a processor core when no threads are active to conserve power, the power mode units disclosed herein are also configured to be capable of reducing or collapsing power provided to the processor core when the processor core has one or more threads in pending status and no threads in active status.

A thread is in pending status in a processor core when the processing of an instruction in the thread consists of waiting for data to be retrieved from outside of the processor core for the instruction without the thread otherwise processing another instruction. For example, an operand of an instruction being processed by a thread may be data in memory located outside of the processor core. If the processor core does not require as much power to operate while a thread is in pending status and waiting for a request from outside of the processor core, the power consumed by the processor core can also be reduced during the latency of these waiting periods. In this manner, power can be conserved in the processor core even when threads are in pending status. A central processing unit (CPU) being able to additionally conserve power when threads are in pending status, as opposed to only when all threads are inactive, can reduce the overall power consumption in the processor core and its corresponding CPU.

In this regard in one aspect, a latency-based power mode unit for controlling a power mode of a processor core is provided. The latency-based power mode unit comprises a power mode input configured to receive power mode information relative to a power level supplied to a processor core for a data access outside of the processor core. The latency-based power mode unit further comprises a thread workload input configured to receive workload information relative to a status of threads in the processor core. The latency-based power mode unit is configured to generate a power mode setting to set the processor core to operate in a reduced power mode if: (1) the workload information indicates that the processor core has one or more threads in pending status and no threads in active; and (2) the power mode information indicates a current data access latency of the one or more threads in pending status corresponding to the reduced power mode. Notably, conditioning the reduced power mode on the current data access latency of the one more threads in pending status allows the processor core to conserve power while the threads are limited to waiting for long latency data. The latency-based power mode unit may also be further configured to provide the power mode setting to a power mode output to provide the power mode setting to a power control unit for controlling power used by the processor core.

In another aspect, a latency-based power mode apparatus for controlling a power mode of a processor core is provided. The latency-based power mode apparatus comprises means for receiving power mode information relative to a power level supplied to a processor core for a data access outside of the processor core. The latency-based power mode apparatus also comprises means for receiving workload information relative to a status of threads in the processor core. The latency-based power mode apparatus also comprises means for generating a power mode setting to set the processor core to operate in a reduced power mode if the workload information indicates that the processor core has one or more threads in pending status and no threads in active status, and the power mode information indicates a current data access latency of the one or more threads in pending status corresponding to the reduced power mode. The latency-based power mode apparatus may also further comprise a means for providing the power mode setting to a means for controlling power used by the processor core.

In another aspect, a method of controlling a power mode of a processor core using a latency-based determination is provided. The method comprises receiving power mode information relative to a power level supplied to a processor core for a data access outside of the processor core. The method further comprises receiving workload information relative to a status of threads in the processor core. The method further comprises generating a power mode setting to set the processor core to operate in a reduced power mode if: (1) the workload information indicates that the processor core has one or more threads in pending status and no threads in active status; and (2) the power mode information indicates a current data access latency of the one or more threads in pending status corresponding to the reduced power mode. The method may also further comprise providing the power mode setting to a power control unit for controlling power used by the processor core.

In another aspect, a non-transitory computer-readable medium having stored thereon computer executable instructions which, when executed by a processor, cause the processor to receive power mode information relative to a power level supplied to a processor core for a data access outside of the processor core. The computer executable instructions further cause the processor to receive workload information relative to a status of threads in the processor core. The computer executable instructions further cause the processor to generate a power mode setting to set the processor core to operate in a reduced power mode if: (1) the workload information indicates that the processor core has one or more threads in pending status and no threads in active status; and (2) the power mode information indicates a current data access latency of the one or more threads in pending status corresponding to the reduced power mode. The computer executable instructions may further cause the processor to provide the power mode setting to a power control unit for controlling power used by the processor core.

DETAILED DESCRIPTION

Figure 1:
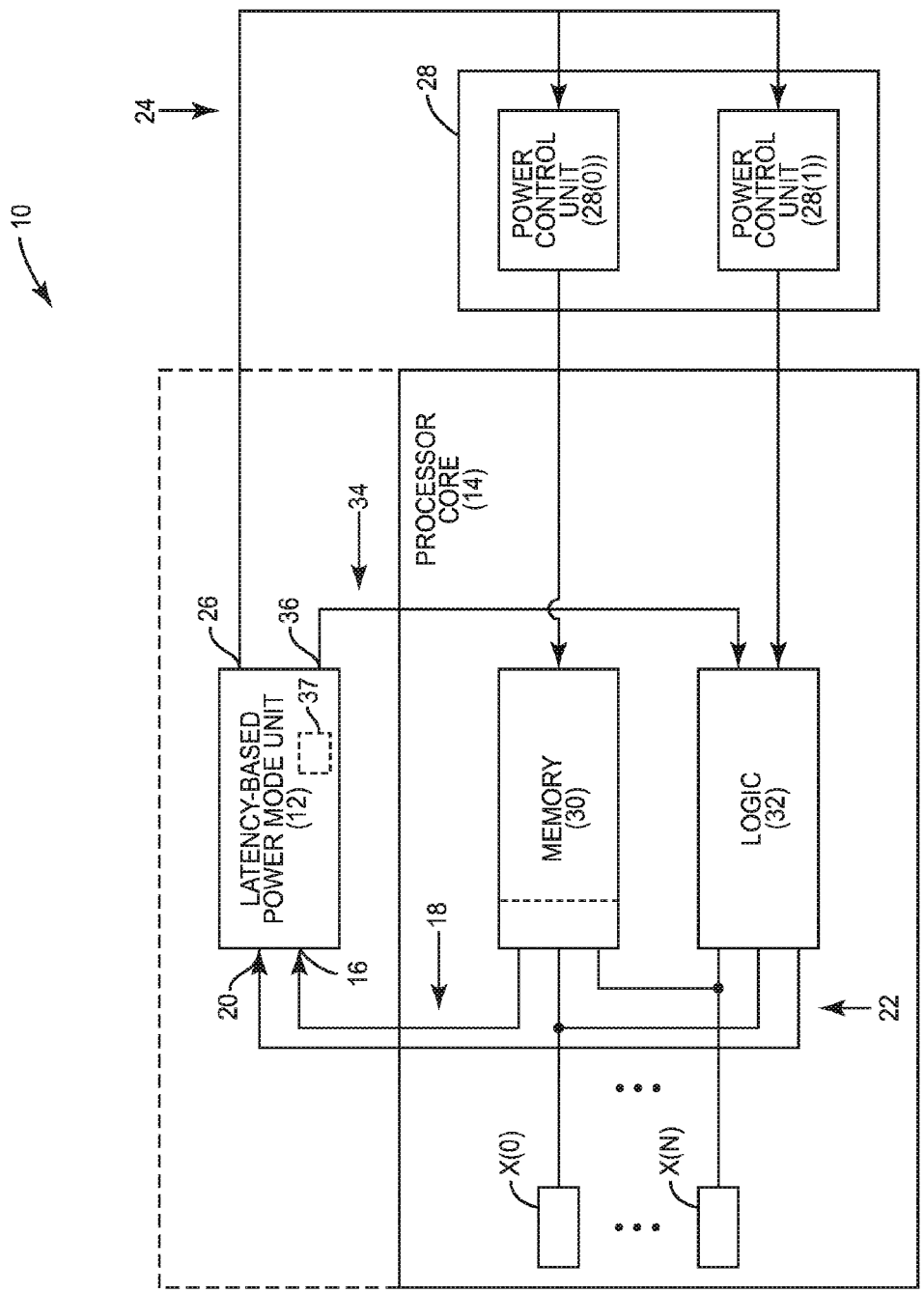
FIG. 1 is a block diagram of an exemplary processor subsystem employing a latency-based power mode unit configured to control power modes of a processor core by reducing a power level supplied to the processor core when the processor core has one or more threads in pending status and no threads in active status.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include latency-based power mode units for controlling power modes of processor cores. Related methods and systems are also disclosed. In this regard, FIG. 1 illustrates an exemplary central processing unit (CPU) subsystem 10 employing an exemplary latency-based power mode unit 12 for controlling a power mode of a processor core 14. The processor core 14 has a plurality of threads X(0)-X(N) that are each configured to provide concurrent processing, where 'N+1' is equal to the number of threads. However, the processor core 14 could include only one (1) thread. As discussed in more detail below, the latency-based power mode unit 12 in FIG. 1 is configured to be capable of reducing or collapsing power provided to the processor core 14 when at least one of the threads X(0)-X(N) in the processor core 14 is in pending status and no threads X(0)-X(N) are active. In this manner, power can be conserved in the processor core 14 even when the threads X(0)-X(N) are in pending status, as opposed to only when the threads X(0)-X(N) in the processor core 14 are inactive.

A thread X in the processor core 14 in FIG. 1 is in pending status when the processing of an instruction in the thread X consists of waiting for data to be retrieved from outside of the processor core 14 for the instruction without the thread X otherwise processing another instruction. Additionally, a thread X in the processor core 14 is in active status if the thread X is not waiting for data to be retrieved from outside of the processor core 14 and the thread X is otherwise processing an instruction. A thread X is in inactive status if the thread X is neither in active nor pending status. For example, an operand of an instruction being processed by a thread X in the processor core 14 may be data in memory located outside of the processor core 14. If the processor core 14 does not require as much power to operate while a thread X is in pending status and waiting for a request from outside of the processor core 14, the power consumed by the processor core 14 can also be reduced during the latency of these waiting periods. In this manner, power can be conserved in the processor core 14 even when the threads X(0)-X(N) are in pending status. Employing the latency-based power mode unit 12 to additionally conserve power when the threads X(0)-X(N) are in pending status, as opposed to only when all threads X(0)-X(N) are inactive, can reduce the overall power consumption in the processor core 14 and the corresponding CPU subsystem 10.

With continuing reference to FIG. 1, before discussing examples of the latency-based power mode unit 12 controlling power modes of the processor core 14 to conserve power, components of the latency-based power mode unit 12 and the CPU subsystem 10 are first described. In this aspect, the latency-based power mode unit 12 includes a power mode input 16. The power mode input 16 is configured to receive power mode information 18 relative to a power level supplied to the processor core 14. In this example, the power mode information 18 includes a power level for a data access outside of the processor core 14. However, the power mode information 18 could also include a power level for other types of data accesses. The latency-based power mode unit 12 also includes a thread workload input 20 configured to receive workload information 22 relative to a status of the threads X(0)-X(N) in the processor core 14. For example, the workload information 22 may include information indicating whether the processor core 14 has one or more threads X(0)-X(N) in pending status and no threads X(0)-X(N) in active status, at least one of the threads X(0)-X(N) in active status, or all inactive threads X(0)-X(N). The latency-based power mode unit 12 is configured to generate a power mode setting 24 to set the processor core 14 to operate in either a reduced or higher power mode based on the power mode information 18 and the workload information 22. The latency-based power mode unit 12 is further configured to provide the power mode setting 24 to a power mode output 26 so as to provide the power mode setting 24 to a power control unit 28 for controlling power used by the processor core 14. In this example, two power control units 28(0), 28(1) are provided. A first power control unit 28(0) is used to control the power provided to a memory 30. A second power control unit 28(1) is used to control the power provided to logic 32 in the processor core 14 for performing or supporting processing therein.

Additionally, in this aspect, the latency-based power mode unit 12 is configured to generate an interrupt 34 on an interrupt output 36 to prepare the processor core 14 to operate in a higher power mode. Alternatively, the latency-based power mode unit 12 may be configured to forego generating the interrupt 34 on the interrupt output 36 when a stored previous instance of the power mode setting 24 is associated with the higher power mode. For example, the stored previous instance of the power mode setting 24 may be stored in a unit memory 37 within the latency-based power mode unit 12.

Figure 2:
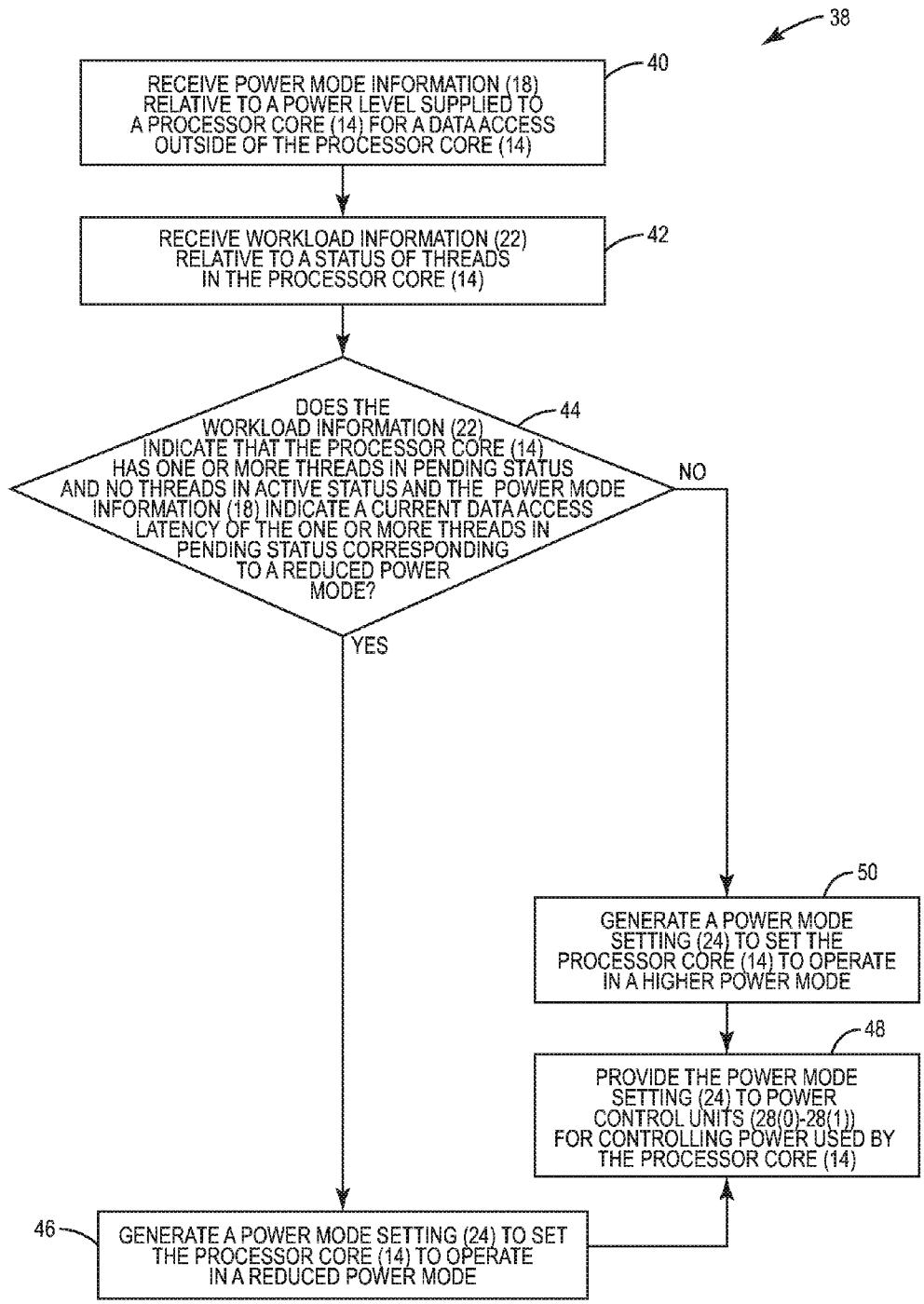
FIG. 2 is a flowchart illustrating an exemplary process of the latency-based power mode unit in FIG. 1 controlling the power modes of the processor core, including reducing the power level supplied to the processor core when the processor core has the one or more threads in pending status and no threads in active status.

FIG. 2 illustrates an exemplary process 38 employed by the latency-based power mode unit 12 in FIG. 1 for controlling power modes of the processor core 14. With reference to FIG. 2, the latency-based power mode unit 12 first receives the power mode information 18 relative to a power level supplied to the processor core 14 for a data access outside of the processor core 14 (block 40). The latency-based power mode unit 12 then receives the workload information 22 representing the status of the threads X(0)-X(N) in the processor core 14 (block 42). The latency-based power mode unit 12 may receive the workload information 22 in block 42 prior to receiving the power mode information 18 in block 40, or simultaneously. Further, once the latency-based power mode unit 12 has received both the power mode information 18 and the workload information 22, the latency-based power mode unit 12 determines the following: (1) if the workload information 22 indicates that the processor core 14 has one or more threads X(0)-X(N) in pending status and no threads X(0)-X(N) in active status; and (2) if the power mode information 18 indicates a current data access latency of the one or more threads X(0)-X(N) in pending status corresponding to a reduced power mode (block 44).

With continuing reference to FIG. 2, if both of these conditions in block 44 are present, this means that the processor core 14 does not have any threads X(0)-X(N) that are active. Further, this also means that the processor core 14 does not have any thread X in pending status that may soon become active. Thus, power provided to the processor core 14 can be reduced in this scenario to conserve power. In this regard, the latency-based power mode unit 12 generates the power mode setting 24 to set the processor core 14 to operate in a reduced power mode (block 46). The latency-based power mode unit 12 provides the power mode setting 24 indicating the reduced power mode to the power control units 28(0), 28(1) for controlling power used by the processor core 14 (block 48).

However, if both conditions in block 44 of FIG. 2 are not present, the processor core 14 may need a higher power level for processing an instruction. For example, a higher power level may be required for a thread X in the processor core 14 to efficiently process an instruction. In this scenario, the latency-based power mode unit 12 generates the power mode setting 24 to set the processor core 14 to operate in a higher power mode (block 50), as opposed to the reduced power mode. The latency-based power mode unit 12 provides the power mode setting 24 to the power control units 28(0), 28(1) for controlling the power used by the processor core 14 (block 48). The process 38 in FIG. 2 can be repeated on an on-going basis to allow the latency-based power mode unit 12 to control the power level for the processor core 14.

Thus, in summary, by the latency-based power mode unit 12 in FIG. 1 employing the process 38 in FIG. 2, the latency-based power mode unit 12 enables power conservation in the processor core 14, even when threads X(0)-X(N) are being processed, if the only threads X(0)-X(N) being processed are in pending status.

Figures 3A, 3B:
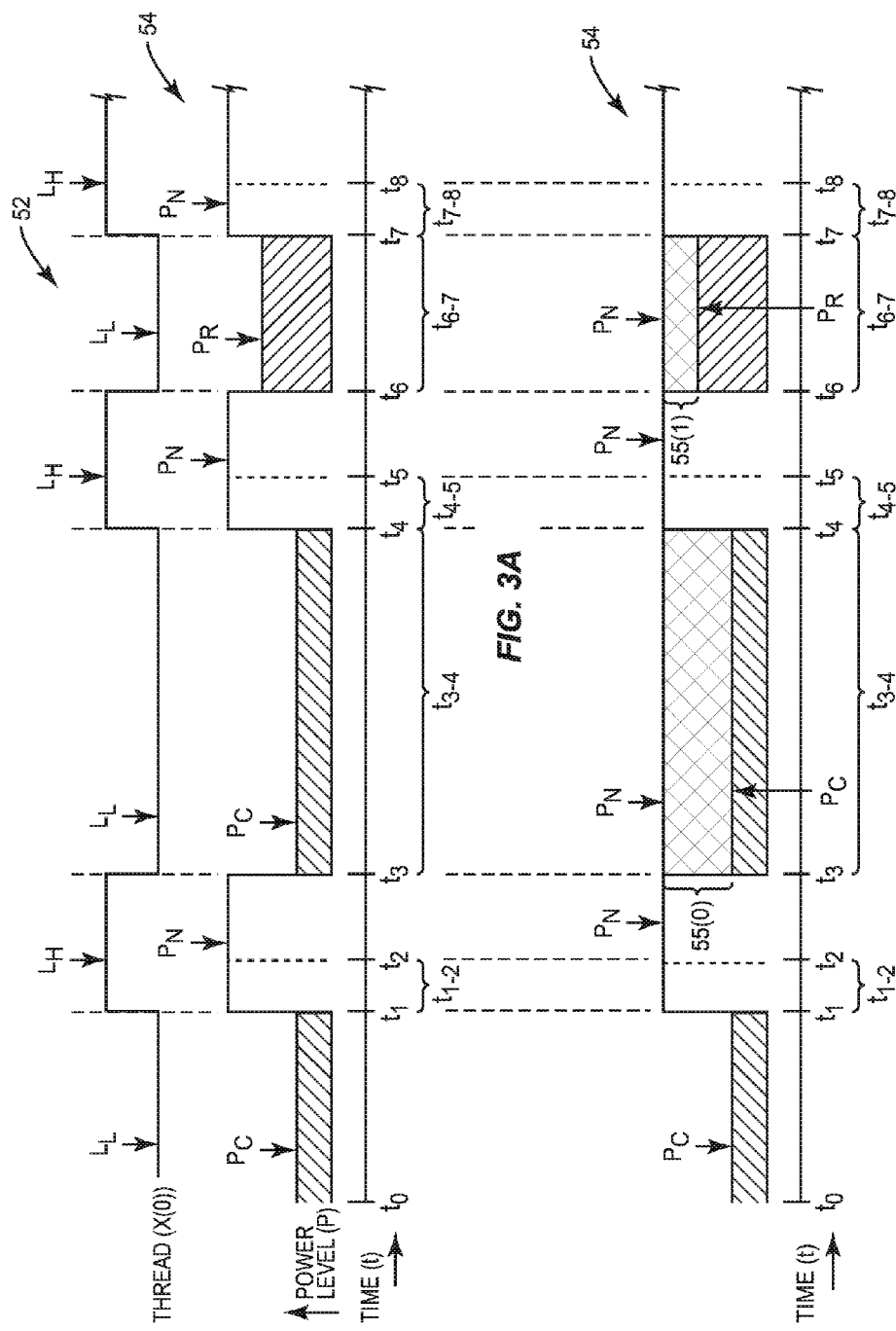
FIG. 3A is a diagram illustrating exemplary thread activity and power level activity of the processor core and a corresponding power mode of the processor core controlled by the latency-based power mode unit in FIG. 1 based on whether a thread is in active, inactive, or pending status.
FIG. 3B is a diagram illustrating exemplary power reduction of the processor core in FIG. 3A as a result of employing the latency-based power mode unit in FIG. 1.

To provide further explanation of the latency-based power mode unit 12 in FIG. 1 reducing power provided to the processor core 14 when threads X(0)-X(N) are in pending status and no threads X(0)-X(N) are active, FIG. 3A is provided. FIG. 3A illustrates an exemplary thread activity graph 52 and a corresponding power level activity graph 54 showing the effects of the latency-based power mode unit 12 on the processor core 14 power levels.

With reference to FIG. 3A, the thread activity graph 52 shows a first thread X(0) in the processor core 14 as being in inactive status at time $t_0$, as illustrated by the low activity level $L_L$. For clarity, the low activity level $L_L$ on the thread activity graph 52 may represent the thread X(0) in either inactive or pending status, while the high activity level $L_H$ represents the thread X(0) in active status. Further, all other threads X(1)-X(N) (not shown) in the processor core 14 are inactive in FIG. 3A. Because all threads X(0)-X(N) are inactive, the processor core 14 is in a reduced power mode with the power level P equal to $P_C$ (e.g., a power collapse level) at time $t_0$, as shown in the power level activity graph 54. As used herein, to power collapse the processor core 14 is to reduce the power supplied to the processor core 14 to a minimum level needed to retain data in the memory 30 and the logic 32. While $P_C$ is larger than a zero power level $P_0$ in this example, some aspects may have $P_C$ equal to $P_0$. Further, at time $t_1$, thread X(0) becomes active, as illustrated by the high activity level $L_H$. In response, the latency-based power mode unit 12 generates the power mode setting 24 to set the processor core 14 to operate at a higher power mode. The latency-based power mode unit 12 also generates the interrupt 34 on the interrupt output 36 in response to generating the power mode setting 24 corresponding to the higher power mode. The interrupt 34 prompts the processor core 14 to conduct "wakeup" procedures during time $t_{1-2}$ in preparation for thread-related activity. Further, the power mode setting 24 causes the power control units 28(0), 28(1) to supply nominal power to the processor core 14, changing the power level P to $P_N$ at time $t_1$.

With continuing reference to FIG. 3A, at time $t_3$, as part of the processing of an instruction, thread X(0) initiates a data access for data stored outside of the processor core 14. Thus, thread X(0) changes to pending status, as shown by the low activity level $L_L$ in the thread activity graph 52 at time $t_3$. Because all other threads $X(1)$-$X(N)$ are still inactive, the workload information 22 indicates that the processor core 14 has one or more threads in pending status and no threads in active status. In this example, the power mode information 18 indicates a current data access latency corresponding to the reduced power mode for thread $X(0)$. Therefore, the latency-based power mode unit 12 generates the power mode setting 24 to set the processor core 14 to the reduced power mode. The power control units 28(0), 28(1) supply a reduced power level to the processor core 14, causing the power level P to fall to $P_C$ at time $t_3$, because the processor core 14 does not require as much power to operate as compared to when threads were active. Thus, even though the thread $X(0)$ is in pending status rather than inactive, the latency-based power mode unit 12 enables the processor core 14 to operate in the reduced power mode beginning at time $t_3$.

With continuing reference to FIG. 3A, the processor core 14 receives the data requested from outside of the processor core 14 for the pending thread $X(0)$ at time $t_4$, causing the thread $X(0)$ to become active, as illustrated by the high activity level $L_H$. This causes the latency-based power mode unit 12 to generate the power mode setting 24 to set the processor core 14 to operate in the higher power mode. The power mode setting 24 causes the power control units 28(0), 28(1) to supply nominal power to the processor core 14, causing the power level P to rise to $P_N$ at time $t_4$. Further, the latency-based power mode unit 12 also generates the interrupt 34, prompting the processor core 14 to conduct wakeup procedures during time $t_{4-5}$. Thus, the latency-based power mode unit 12 enabled the processor core 14 to operate at $P_C$ starting at time $t_3$ when the thread $X(0)$ became pending, until time $t_4$ when the thread $X(0)$ received the requested data.

In this regard, with continuing reference to FIG. 3A, time $t_{3-4}$ corresponds to the data access latency associated with the data access outside of the processor core 14 that placed the thread $X(0)$ into pending status. Thus, the processor core 14 remained in the reduced power mode with the power level P set to $P_C$ during time $t_{3-4}$, thereby conserving power within the processor core 14 throughout that timeframe. The amount of power conserved in the processor core 14 by reducing the power level P to $P_C$ while the thread $X(0)$ was in pending status is illustrated in FIG. 3B. More specifically, a power total 55(0) shows that a total power of $P_N$-$P_C$ was conserved in the processor core 14 during time $t_{3-4}$, as compared to no conserved power if the power level P remained at $P_N$ while the thread $X(0)$ was in pending status.

With continuing reference to FIG. 3A, at time $t_6$, the thread $X(0)$ initiates a data access for data stored outside of the processor core 14, and thus the thread $X(0)$ changes to pending status, as illustrated by the low activity level $L_L$. Similar to the previous data access during time $t_{3-4}$, the power mode information 18 indicates a current data access latency corresponding to the reduced power mode for the thread $X(0)$. Because all other threads $X(1)$-$X(N)$ are inactive while the thread $X(0)$ is pending, the workload information 22 indicates that the processor core 14 has one thread in pending status and no threads in active status. Based on the power mode information 18 and the workload information 22, the latency-based power mode unit 12 generates the power mode setting 24 to set the processor core 14 to the reduced power mode. Thus, the power control units 28(0), 28(1) supply a reduced power level to the processor core 14, causing the power level P to fall to $P_R$ at time $t_6$. Upon receiving the data requested from outside of the processor core 14, the thread $X(0)$ becomes active at time $t_7$, as illustrated by the high activity level $L_H$. This causes the latency-based power mode unit 12 to generate the power mode setting 24 to set the processor core 14 to operate in the higher power mode. Further, the latency-based power mode unit 12 also generates the interrupt 34, prompting the processor core 14 to conduct wakeup procedures during time $t_{7-8}$. The power mode setting 24 causes the power control units 28(0), 28(1) to supply nominal power to the processor core 14, causing the power level P to rise to $P_N$ at time $t_7$.

With continuing reference to FIG. 3A, time $t_{6-7}$ corresponds to the data access latency associated with the data access outside of the processor core 14 that placed the thread $X(0)$ into pending status at time $t_6$. Thus, the processor core 14 remained in the reduced power mode with the power level P set to $P_R$ during time $t_{6-7}$, thereby conserving power within the processor core 14 throughout that timeframe. The amount of power conserved in the processor core 14 by reducing the power level P to $P_R$ while the thread $X(0)$ was in pending status is illustrated in FIG. 3B. More specifically, a power total 55(1) shows that a total power of $P_N$-$P_R$ was conserved in the processor core 14 during time $t_{6-7}$, as opposed to a lack of power conservation had the power level P remained at $P_N$ while the thread $X(0)$ was in pending status.

Notably, although the processor core 14 operates in the reduced power mode during time $t_{3-4}$ and time $t_{6-7}$, the power level $P_C$ is lower during time $t_{3-4}$ than the power level $P_R$ during time $t_{6-7}$. Such a difference in the power level P during separate instances of the reduced power mode is due to the power level P being dependent on the corresponding data access latency. For example, the data access latency associated with time $t_{3-4}$ is longer than the data access latency associated with time $t_{6-7}$. The processor core 14 may operate at the power level $P_C$ during time $t_{3-4}$ because the power conserved during such a long data access latency outweighs any performance penalty associated with waking up the processor core 14 from the power collapse state. Conversely, the power conserved by power collapsing the processor core 14 during a data access latency as short as that associated with time $t_{6-7}$ may not justify such a performance penalty. However, waking up the processor core 14 from the power level $P_R$ has a smaller performance penalty as compared to the power level $P_C$. Thus, only reducing the processor core 14 to the power level $P_R$ during time $t_{6-7}$ may conserve enough power so as to justify the performance penalty associated with waking up the processor core 14 from the power level $P_R$. Therefore, the latency-based power mode unit 12 is configured to generate the power mode setting 24 that corresponds to the amount of time the processor core 14 must wait for a particular data access.

With reference to FIG. 1, specific details of the aspects disclosed herein are now provided. In this aspect, the power mode input 16 on the latency-based power mode unit 12 is configured to receive the power mode information 18 from the memory 30 within the processor core 14. Alternatively, the power mode information 18 may be stored in another memory external to the processor core 14. As previously described, the power mode information 18 includes information relative to which power mode should be supplied to the processor core 14. More specifically, the power mode information 18 may include information pertaining to the latency of a data access outside of the processor core 14 and a power mode corresponding to the data access. As a non-limiting example, the power mode information 18 may include an identifier of a data interface from which the data is requested, a latency corresponding to accessing data from the data interface, and the power mode corresponding to the particular data interface. In this manner, a reduced power mode can be associated with the latency associated with accessing data from a particular data interface outside of the processor core 14. As a non-limiting example, accessing data from a lower level of memory following a level two (L2) cache miss may be associated with the reduced power mode if such a data access has a relatively long latency. Similarly, accessing data from an uncacheable peripheral having a relatively long data access latency may also correspond to the reduced power mode.

With continuing reference to FIG. 1, the latency-based power mode unit 12 is configured to receive the workload information 22 from the logic 32 within the processor core 14 by way of the thread workload input 20. As previously described, the workload information 22 includes information relative to a status of the threads X(0)-X(N) within the processor core 14. In particular, the workload information 22 may include information indicating whether the processor core 14 has one or more threads X(0)-X(N) in pending status and no threads X(0)-X(N) in active status, at least one thread X in active status, or all inactive threads X(0)-X(N). Thus, the power mode information 18 and the workload information 22 provide details regarding whether one of the threads X(0)-X(N) in pending status has a data access latency associated with a reduced power mode, and if current activity of the processor core 14 is able to support a reduction in power.

With continuing reference to FIG. 1, in this aspect, the power mode setting 24 may vary based on the conditions present in the processor core 14. For example, the latency-based power mode unit 12 is further configured to generate the power mode setting 24 to set the processor core 14 to operate in the reduced power mode if the workload information 22 indicates that all threads X(0)-X(N) in the processor core 14 are inactive. In particular, if no threads X(0)-X(N) are in pending or active status, the processor core 14 is able to support the reduced power mode because the memory 30 and the logic 32 within the processor core 14 do not require full power when no threads X(0)-X(N) are processing instructions. Additionally, the latency-based power mode unit 12 is also configured to generate the power mode setting 24 to set the processor core 14 to operate in a higher power mode if the conditions for a reduced power mode are not met. More specifically, the power mode setting 24 generated will reflect a higher power mode if the power mode information 18 indicates that the data access latency of one of the threads X(0)-X(N) in pending status does not correspond to the reduced power mode. Similarly, the power mode setting 24 will set the processor core 14 to run in the higher power mode if the workload information 22 indicates that the processor core 14 has at least one thread X in active status. Thus, the latency-based power mode unit 12 is configured to generate the power mode setting 24 in accordance with the current requirements of the processor core 14.

With continuing reference to FIG. 1, in this aspect, the latency-based power mode unit 12 is also configured to notify the processor core 14 when the power mode setting 24 generated indicates the higher power mode. In particular, the processor core 14 may need to take certain steps in order to transition from the reduced power mode to the higher power mode, commonly referred to as the processor core 14 "waking up." Thus, the latency-based power mode unit 12 is configured to generate the interrupt 34 on the interrupt output 36 in response to generating the power mode setting 24 to set the processor core 14 to operate in the higher power mode. The interrupt 34 is provided to the logic 32 in the processor core 14 so as to notify the processor core 14 to prepare for operation in the higher power mode. Alternatively, the latency-based power mode unit 12 may be configured to generate the interrupt 34 in response to generating the power mode setting 24 to set the processor core 14 to operate in the reduced power mode. In this manner, the interrupt 34 may be provided to the logic 32 in the processor core 14 so that the logic 32 may take steps to transition from the higher power mode to the reduced power mode.

With continuing reference to FIG. 1, in this aspect, the latency-based power mode unit 12 is disposed within the processor core 14. However, the latency-based power mode unit 12 may otherwise be disposed external to the processor core 14 in other aspects and produce power conservation benefits. Thus, the latency-based power mode unit 12 may assist in conserving power in the processor core 14, even when the threads X(0)-X(N) are being processed, if the only threads X(0)-X(N) being processed are in pending status regardless of the location of the latency-based power mode unit 12 in the CPU subsystem 10.

In addition to considering the thread status and any corresponding data access latencies, the latency-based power mode unit 12 may take into account the timing of future activity of the threads X(0)-X(N) when generating the power mode setting 24. For example, if one of the threads X(0)-X(N) is scheduled to become active a relatively short time after the same or another thread X(0)-X(N) changes to pending status, the overhead required to reduce the power in such a short period of time may outweigh any power conservation. In this regard, FIG. 4 illustrates an exemplary process 56 employed by the latency-based power mode unit 12 in FIG. 1 for controlling power modes of the processor core 14 based, in part, on how soon one of the threads X(0)-X(N) may become active following a data access request.

Figure 4:
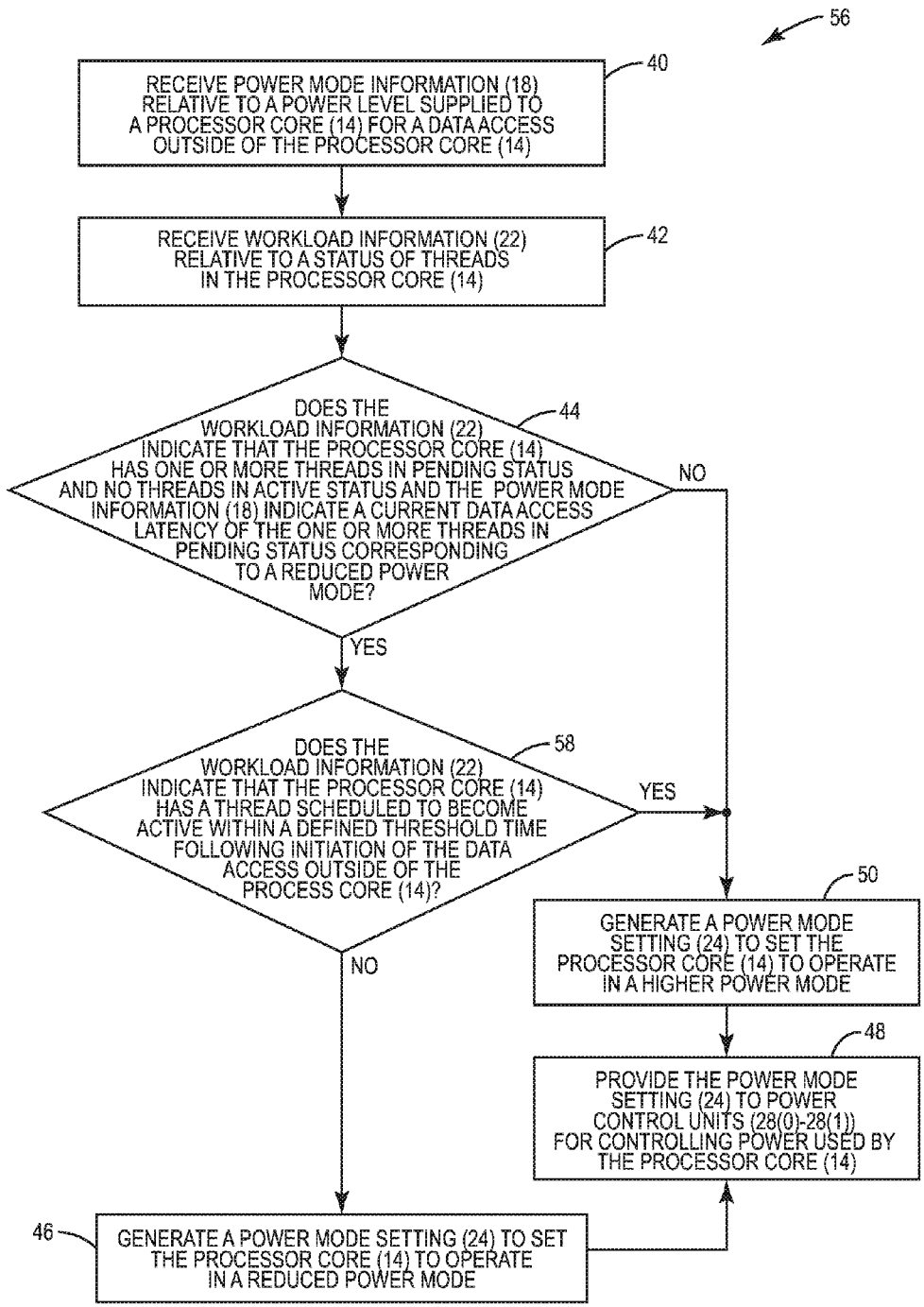
FIG. 4 is a flowchart illustrating an exemplary process of the latency-based power mode unit in FIG. 1 controlling the power modes of the processor core wherein a power mode setting associated with either a lower power mode or a higher power mode may be generated based on the duration of a data access latency.

With continuing reference to FIG. 4, the steps in block 40, block 42, block 44, block 46, block 48, and block 50 are the same as previously described in FIG. 2. However, if both conditions in block 44 are present, rather than generating the power mode setting 24 for the reduced power mode, the latency-based power mode unit 12 makes an additional determination. In particular, the latency-based power mode unit 12 determines whether the workload information 22 indicates that the processor core 14 has a thread X scheduled to become active within a defined threshold time following initiation of the data access outside of the processor core 14 (block 58). For example, a first thread X(0) may transition to pending status while no other threads X(1)-X(N) are in active status. If a second thread X(1) is scheduled to become active soon after the first thread X(0) transitions to pending status, then it may be inefficient for the processor core 14 to enter the reduced power mode only to have to enter the higher power mode once the second thread X(1) is in active status. Thus, the defined threshold time may represent a minimum duration of time in which the processor core 14 needs to have one or more threads X(0)-X(N) in pending status and no threads X(0)-X(N) in active status in order to justify entering the reduced power mode. The performance penalty associated with waking up the processor core 14 may be an important factor in determining such timing.

In this manner, with continuing reference to FIG. 4, if a thread X is scheduled to become active within the defined threshold time at block 58, then the latency-based power mode unit 12 is configured to generate the power mode setting 24 for the higher power mode (block 50). Conversely, if none of the threads X(0)-X(N) are scheduled to become active within the defined threshold time at block 58, then the latency-based power mode unit 12 is configured to generate the power mode setting 24 for the reduced power mode (block 46). Upon generation of the power mode setting 24 at either block 46 or block 50, the latency-based power mode unit 12 is configured to provide the power mode setting 24 to the power control units 28(0), 28(1) for controlling power used by the processor core 14 at block 48. By employing the process 56, the latency-based power mode unit 12 enables power conservation in the processor core 14, even when the threads X(0)-X(N) are being processed, if the only threads X(0)-X(N) being processed are in pending status, and if the corresponding data access latencies justify the processor core 14 entering the reduced power mode.

Figure 5:
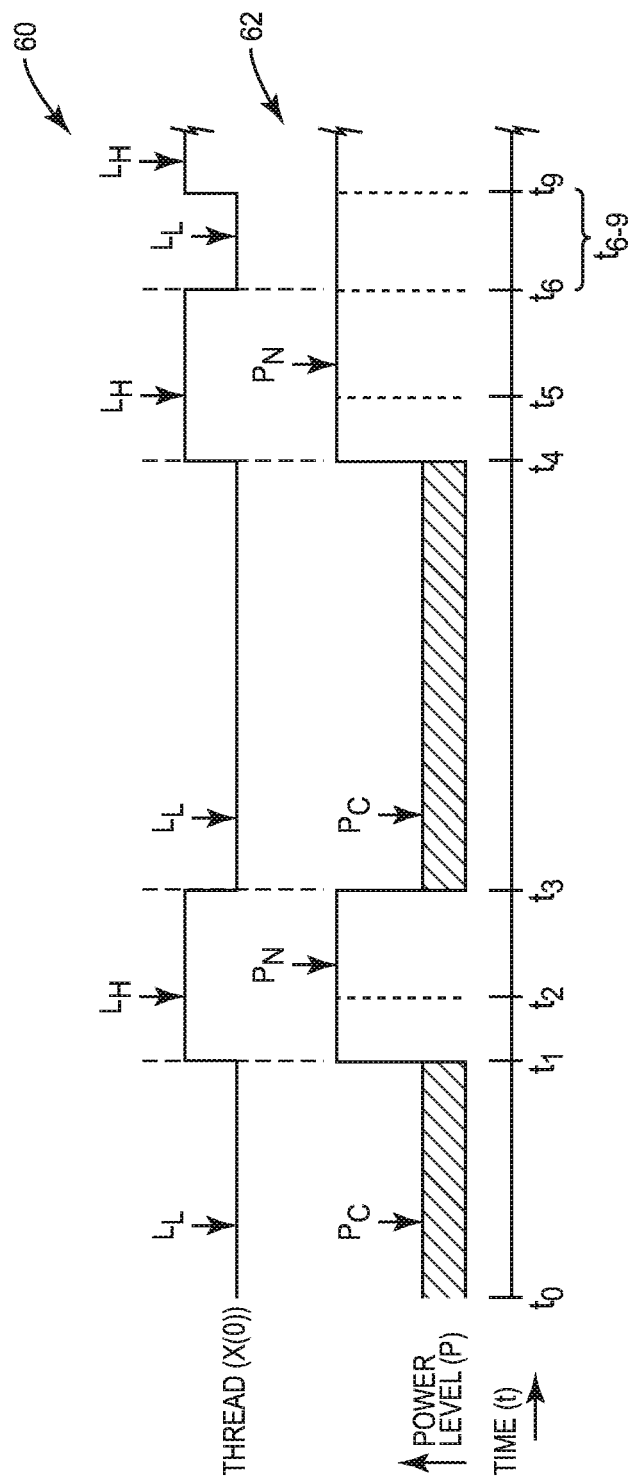
FIG. 5 is a diagram illustrating exemplary thread activity and power level activity of the processor core and the corresponding power mode of the processor core controlled by the latency-based power mode unit in FIG. 1 when a thread is scheduled to become active within a defined threshold time of a data access outside of the processor core.

In this regard, FIG. 5 illustrates a thread activity graph 60 and a corresponding power level activity graph 62 of the processor core 14 in FIG. 1 when the thread X(0) is scheduled to become active within the defined threshold time of a data access outside of the processor core 14, while all other threads X(1)-X(N) (not shown) remain inactive. Transitions and related timing of the thread activity graph 60 and the power level activity graph 62 up to time $t_6$ are identical to transitions and related timing of the thread activity graph 52 and the power level activity graph 54 up to time $t_6$ in FIG. 3A.

At time $t_6$ in FIG. 5 however, the thread X(0) initiates a data access for data stored outside of the processor core 14, and thus the thread X(0) changes to pending status, as illustrated by the low activity level $L_L$. However, although the thread X(0) is in pending status while no other threads are in active status, the thread X(0) is scheduled to become active at time $t_9$, as illustrated by the high activity level $L_H$. Further, time $t_9$ occurs within the defined threshold time for the processor core 14. As a result, rather than the latency-based power mode unit 12 generating the power mode setting 24 to set the processor core 14 to operate in the reduced power mode, the power mode setting 24 continues to correspond to the higher power mode. Thus, the power level P remains at $P_N$ during time $t_{6-9}$, as opposed to falling to $P_C$ or $P_R$ if time $t_9$ were not within the defined threshold time. Further, when the thread X(0) becomes active at time $t_9$, as illustrated by the high activity level $L_H$, the power level P remains at $P_N$. Notably, because the processor core 14 remained at $P_N$ during time $t_{6-9}$, the processor core 14 did not require time to complete its wakeup procedures upon the thread X(0) becoming active at time $t_9$. In this manner, configuring the latency-based power mode unit 12 to generate the power mode setting 24 for the higher power mode when a thread is scheduled to become active within the defined threshold time following initiation of a data access outside of the processor core 14 may reduce processing time, as well as conserve power.

Figure 6:
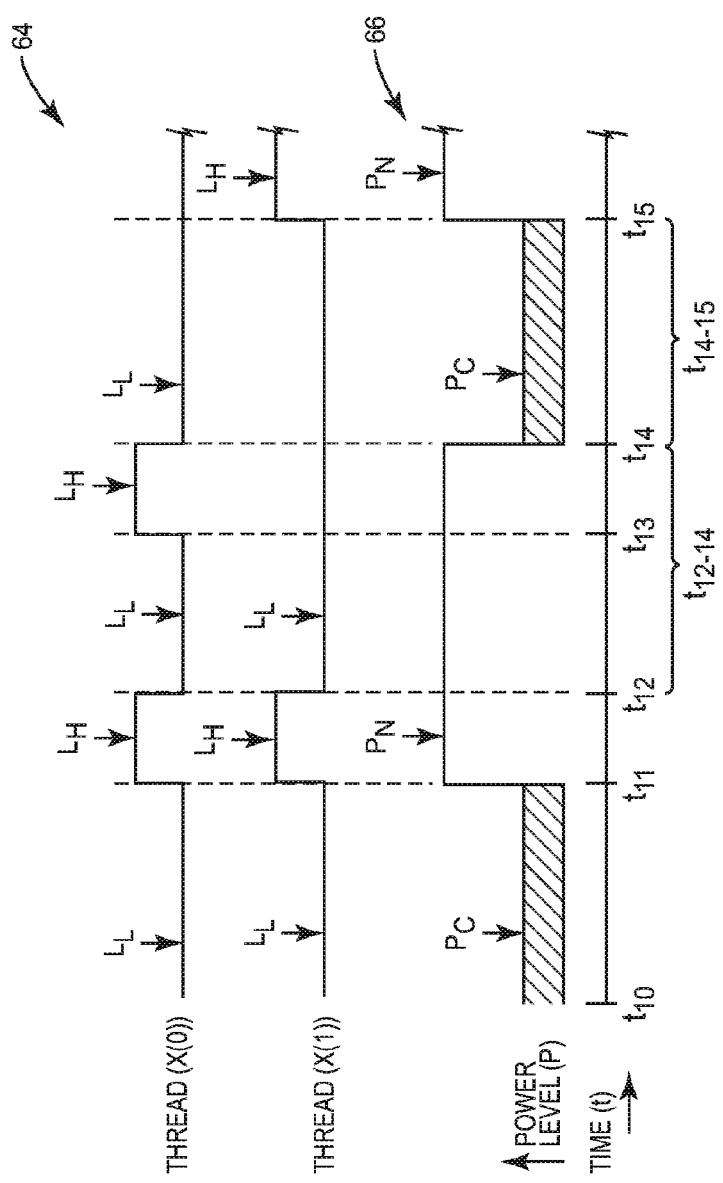
FIG. 6 is a diagram illustrating exemplary thread activity and power level activity of the processor core and the corresponding power mode of the processor core controlled by the latency-based power mode unit in FIG. 1 when two threads within the processor core transition between pending, active, and inactive status.

Additionally, FIG. 6 illustrates a thread activity graph 64 and a corresponding power level activity graph 66 of the processor core 14 in FIG. 1 when two threads change between pending, active, and inactive status. In this manner, the thread activity graph 64 illustrates the activity of a first thread X(0) and a second thread X(1), while all other threads X(2)-X(N) (not shown) remain inactive.

With continuing reference to FIG. 6, the thread activity graph 64 shows the first thread X(0) and the second thread X(1) in inactive status at time $t_{10}$, as illustrated by the low activity levels $L_L$. Consequently, the power level activity graph 66 shows that the power level P is at $P_C$ at time $t_{10}$. Further, both the first thread X(0) and the second thread (1) become active at time $t_{11}$, as shown by the high activity levels $L_H$. This causes the latency-based power mode unit 12 to generate the power mode setting 24 to set the processor core 14 to the higher power mode. The higher power mode causes the power control units 28(0), 28(1) to supply nominal power to the processor core 14, which in turn causes the power level P to rise to $P_N$ at time $t_{11}$. At time $t_{12}$, the first thread X(0) and the second thread X(1) both transition to pending status, as shown by the low activity levels $L_L$. However, while the power mode information 18 indicates a current data access latency corresponding to the reduced power mode for the second thread X(1) until thread X(1) is scheduled to become active at time $t_{15}$, the first thread X(0) is scheduled to become active again at time $t_{13}$, as shown by the high activity level $L_H$. The time $t_{13}$ occurs within the defined threshold time for the processor core 14, resulting in the latency-based power mode unit 12 generating the power mode setting 24 to set the processor core 14 to the higher power mode at time $t_{12}$. Thus, the power level P remains at $P_N$ during time $t_{12-14}$. Notably in this aspect, the latency-based power mode unit 12 is configured to generate the power mode setting 24 associated with the higher power mode at time $t_{12}$ although the previous instance of the power mode setting 24 was associated with the higher power mode. However, other aspects of the latency-based power mode unit 12 may forego generating the power mode setting 24 to set the processor core 14 to the higher power mode or reduced power mode when a stored previous instance of the power mode setting 24 is associated with the higher power mode or reduced power mode, respectively. For example, the stored previous instance of the power mode setting 24 may be stored in the unit memory 37 within the latency-based power mode unit 12.

With continuing reference to FIG. 6, the first thread X(0) completes the processing of its instruction and becomes inactive at time $t_{14}$, as illustrated by the low activity level $L_L$. However, the second thread X(1) remains in pending status at time $t_{14}$, and is scheduled to become active at time $t_{15}$, as shown by the high activity level $L_H$. In this example, the second thread X(1) has a remaining data access latency that is associated with the reduced power mode. Additionally, the only thread scheduled to become active is the second thread X(1) at time $t_{15}$, which is not within the defined threshold time of the processor core 14. Thus, the latency-based power mode unit 12 is configured to generate the power mode setting 24 to set the processor core 14 to operate in the reduced power mode at time $t_{14}$. As a result, the power level P is set to $P_C$ during time $t_{14-15}$. The second thread X(1) changes to active status at time $t_{15}$, as shown by the high activity level $L_H$. The latency-based power mode unit 12 generates the power mode setting 24 to the higher power mode, resulting in the power level P returning to $P_N$ at time $t_{15}$. In this manner, the latency-based power mode unit 12 enables the processor core 14 to conserve power even as multiple threads change between pending, active, and inactive status.

The latency-based power mode units for controlling power modes of processor cores, and related methods and systems, according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 7:
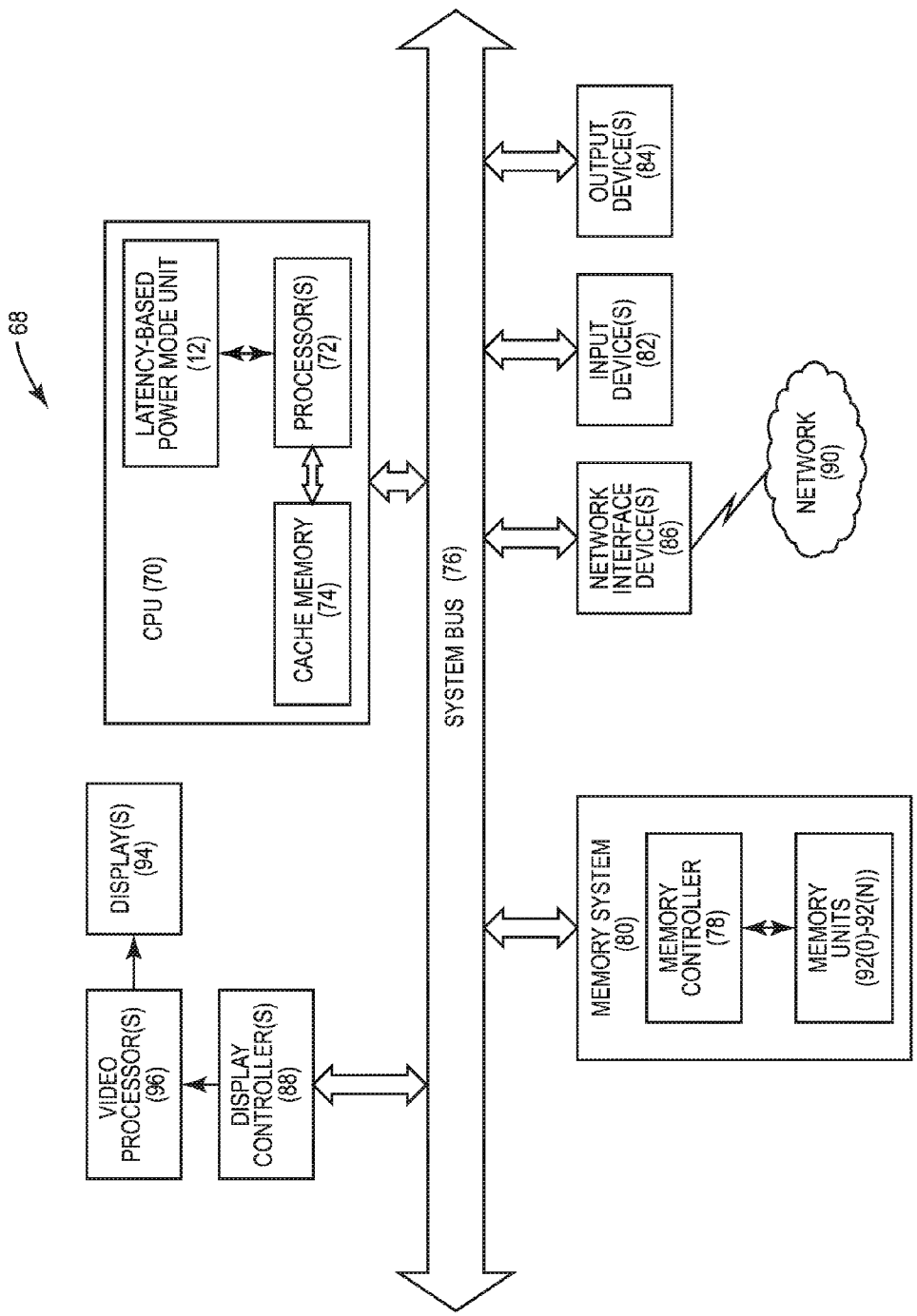
FIG. 7 is a block diagram of an exemplary processor-based system that can include a central processing unit (CPU) containing one or more processor cores and the latency-based power mode unit in FIG. 1.

In this regard, FIG. 7 illustrates an example of a processor-based system 68 that can employ the latency-based power mode unit 12 illustrated in FIG. 1. In this example, the processor-based system 68 includes one or more CPUs 70, each including one or more processors 72. The CPU(s) 70 may have cache memory 74 coupled to the processor(s) 72 for rapid access to temporarily stored data. The CPU(s) 70 is coupled to a system bus 76 and can intercouple master and slave devices included in the processor-based system 68. As is well known, the CPU(s) 70 communicates with these other devices by exchanging address, control, and data information over the system bus 76. For example, the CPU(s) 70 can communicate bus transaction requests to a memory controller 78 as an example of a slave device. Although not illustrated in FIG. 7, multiple system buses 76 could be provided, wherein each system bus 76 constitutes a different fabric.

Other master and slave devices can be connected to the system bus 76. As illustrated in FIG. 7, these devices can include a memory system 80, one or more input devices 82, one or more output devices 84 one or more network interface devices 86, and one or more display controllers 88, as examples. The input device(s) 82 can include any type of input device, including but not limited to input keys, switches, voice processors, etc. The output device(s) 84 can include any type of output device, including but not limited to audio, video, other visual indicators, etc. The network interface device(s) 86 can be any devices configured to allow exchange of data to and from a network 90. The network 90 can be any type of network, including but not limited to a wired or wireless network, a private or public network, a local area network (LAN), a wide local area network (WLAN), and the Internet. The network interface device(s) 86 can be configured to support any type of communications protocol desired. The memory system 80 can include one or more memory units 92(0-N).

The CPU(s) 70 may also be configured to access the display controller(s) 88 over the system bus 76 to control information sent to one or more displays 94. The display controller(s) 88 sends information to the display(s) 94 to be displayed via one or more video processors 96, which process the information to be displayed into a format suitable for the display(s) 94. The display(s) 94 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A latency-based power mode unit for controlling a power mode of a processor core, comprising:
 a power mode input configured to receive power mode information relative to a power level supplied to a processor core for a data access outside of the processor core, wherein the power mode information comprises:
  a data access latency of accessing data from at least one data interface; and
  a power mode corresponding to the at least one data interface; and
 a thread workload input configured to receive workload information relative to a status of threads in the processor core;
 the latency-based power mode unit configured to generate a power mode setting to set the processor core to operate in a reduced power mode if the workload information indicates that the processor core has one or more threads in pending status and no threads in active status, and the power mode information indicates the data access latency and the power mode corresponding to the at least one data interface of each of the one or more threads in pending status corresponding to the reduced power mode.

2. The latency-based power mode unit of claim 1, further configured to provide the power mode setting to a power mode output to provide the power mode setting to a power control unit for controlling power used by the processor core.

3. The latency-based power mode unit of claim 1, wherein the reduced power mode comprises a power collapse level.

4. The latency-based power mode unit of claim 3, wherein the reduced power mode further comprises a reduced power level that is lower than a nominal power level and higher than the power collapse level.

5. The latency-based power mode unit of claim 1, further configured to generate the power mode setting to set the processor core to operate in a higher power mode if the power mode information indicates a data access latency not corresponding to the reduced power mode.

6. The latency-based power mode unit of claim 5, further configured to:
 track initiation of the data access outside of the processor core; and
 generate the power mode setting to set the processor core to operate in the higher power mode if the workload information indicates that the processor core has a thread scheduled to become active within a defined threshold time following the initiation of the data access outside of the processor core.

7. The latency-based power mode unit of claim 5, further configured to:
 not generate the power mode setting to set the processor core to operate in the reduced power mode if a stored previous instance of the power mode setting set the processor core to operate in the reduced power mode; and
 not generate the power mode setting to set the processor core to operate in the higher power mode if the stored previous instance of the power mode setting set the processor core to operate in the higher power mode.

8. The latency-based power mode unit of claim 1, further configured to generate the power mode setting to set the processor core to operate in a higher power mode if the workload information indicates that the processor core has at least one thread in active status.

9. The latency-based power mode unit of claim 8, further configured to, in response to generating the power mode setting to set the processor core to operate in the higher power mode, generate an interrupt to the processor core indicating the power mode setting is set to the higher power mode.

10. The latency-based power mode unit of claim 1, further configured to generate the power mode setting to set the processor core to operate in the reduced power mode if the workload information indicates that all threads in the processor core are inactive.

11. The latency-based power mode unit of claim 1, wherein the latency-based power mode unit is disposed external of the processor core.

12. The latency-based power mode unit of claim 1, wherein the latency-based power mode unit is disposed within the processor core.

13. The latency-based power mode unit of claim 1, wherein the data access comprises:
 a load from a memory resulting from a level two (L2) cache miss; or
 a load from an uncacheable peripheral.

14. The latency-based power mode unit of claim 1 integrated into an integrated circuit (IC).

15. The latency-based power mode unit of claim 1 integrated into a device selected from the group consisting of a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

16. A latency-based power mode apparatus for controlling a power mode of a processor core, comprising:
 means for receiving power mode information relative to a power level supplied to a processor core for a data access outside of the processor core, wherein the power mode information comprises:
  a data access latency of accessing data from at least one data interface; and
  a power mode corresponding to the at least one data interface;
 means for receiving workload information relative to a status of threads in the processor core; and
 means for generating a power mode setting to set the processor core to operate in a reduced power mode if the workload information indicates that the processor core has one or more threads in pending status and no threads in active status, and the power mode information indicates the data access latency and the power mode corresponding to the at least one data interface of each of the one or more threads in pending status corresponding to the reduced power mode.

17. The latency-based power mode apparatus of claim 16, further comprising a means for providing the power mode setting to a means for controlling power used by the processor core.

18. A method of controlling a power mode of a processor core using a latency-based determination, comprising:
 receiving power mode information relative to a power level supplied to a processor core for a data access outside of the processor core, wherein the power mode information comprises:

a data access latency of accessing data from at least one data interface; and a power mode corresponding to the at least one data interface;

receiving workload information relative to a status of threads in the processor core; and generating a power mode setting to set the processor core to operate in a reduced power mode if the workload information indicates that the processor core has one or more threads in pending status and no threads in active status, and the power mode information indicates the data access latency and the power mode corresponding to the at least one data interface of each of the one or more threads in pending status corresponding to the reduced power mode.

19. The method of claim 18, further comprising providing the power mode setting to a power control unit for controlling power used by the processor core.

20. The method of claim 18, wherein the reduced power mode comprises a power collapse level.

21. The method of claim 20, wherein the reduced power mode further comprises a reduced power level that is lower than a nominal power level and higher than the power collapse level.

22. The method of claim 18, further comprising generating the power mode setting to set the processor core to operate in a higher power mode if the power mode information indicates a data access latency not corresponding to the reduced power mode.

23. The method of claim 22, further comprising:

tracking initiation of the data access outside of the processor core; and generating the power mode setting to set the processor core to operate in the higher power mode if the workload information indicates that the processor core has a thread scheduled to become active within a defined threshold time following the initiation of the data access outside of the processor core.

24. The method of claim 18, further comprising generating the power mode setting to set the processor core to operate in a higher power mode if the workload information indicates that the processor core has at least one thread in active status.

25. The method of claim 24, further comprising, in response to generating the power mode setting to set the processor core to operate in the higher power mode, generating an interrupt to the processor core indicating the power mode setting is set to the higher power mode.

26. The method of claim 18, further comprising generating the power mode setting to set the processor core to operate in the reduced power mode if the workload information indicates that all threads in the processor core are inactive.

27. A non-transitory computer-readable medium having stored thereon computer executable instructions which, when executed by a processor, cause the processor to:

receive power mode information relative to a power level supplied to a processor core for a data access outside of the processor core, wherein the power mode information comprises:

a data access latency of accessing data from at least one data interface; and a power mode corresponding to the at least one data interface;

receive workload information relative to a status of threads in the processor core; and generate a power mode setting to set the processor core to operate in a reduced power mode if the workload information indicates that the processor core has one or more threads in pending status and no threads in active status, and the power mode information indicates the data access latency and the power mode corresponding to the at least one data interface of each of the one or more threads in pending status corresponding to the reduced power mode.

28. The non-transitory computer-readable medium of claim 27, wherein the computer executable instructions, when executed by the processor, further cause the processor to provide the power mode setting to a power control unit for controlling power used by the processor core.

29. The non-transitory computer-readable medium of claim 27, wherein the computer executable instructions, when executed by the processor, further cause the processor to generate the power mode setting to set the processor core to operate in a higher power mode if the power mode information indicates a data access latency not corresponding to the reduced power mode.

30. The non-transitory computer-readable medium of claim 27, wherein the computer executable instructions, when executed by the processor, further cause the processor to generate the power mode setting to set the processor core to operate in a higher power mode if the workload information indicates that the processor core has at least one thread in active status.

* * * * *